United States Patent
Ding et al.

(10) Patent No.: US 10,292,162 B2
(45) Date of Patent: May 14, 2019

(54) METHOD FOR SELECTING USER SERVICE MODE, METHOD FOR SENDING PILOT INFORMATION, AND APPARATUSES, AND STORAGE MEDIUM

(71) Applicant: ZTE CORPORATION, Shenzhen (CN)

(72) Inventors: Meiling Ding, Shenzhen (CN); Fan Shi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 49 days.

(21) Appl. No.: 15/320,341

(22) PCT Filed: Sep. 23, 2014

(86) PCT No.: PCT/CN2014/087169
§ 371 (c)(1),
(2) Date: Apr. 20, 2017

(87) PCT Pub. No.: WO2015/192521
PCT Pub. Date: Dec. 23, 2015

(65) Prior Publication Data
US 2017/0230955 A1    Aug. 10, 2017

(30) Foreign Application Priority Data
Jun. 20, 2014    (CN) .......................... 2014 1 0280386

(51) Int. Cl.
*H04W 4/00*        (2018.01)
*H04W 72/04*       (2009.01)
(Continued)

(52) U.S. Cl.
CPC ............ *H04W 72/046* (2013.01); *H04B 7/26* (2013.01); *H04L 5/006* (2013.01); *H04L 5/0025* (2013.01);
(Continued)

(58) Field of Classification Search
None
See application file for complete search history.

(56) References Cited

U.S. PATENT DOCUMENTS

| | | |
|---|---|---|
| 8,059,609 B2 | 11/2011 | Kim et al. |
| 2007/0223422 A1 | 9/2007 | Kim et al. |

(Continued)

FOREIGN PATENT DOCUMENTS

| | | |
|---|---|---|
| CN | 101405959 A | 4/2009 |
| CN | 102857278 A | 1/2013 |

(Continued)

OTHER PUBLICATIONS

PCT International Search Report dated Mar. 17, 2015, Application No. PCT/CN2014/087169, 5 Pages.

(Continued)

*Primary Examiner* — Farah Faroul
(74) *Attorney, Agent, or Firm* — Plumsea Law Group, LLC

(57) ABSTRACT

A user service mode selection method in the case of 3D beams, a pilot frequency information sending method and apparatus are disclosed. The selection method includes: comparing the total number of the users to be served with that of scheduling units; selecting a single-user service mode for each user when the total number of the users to be served is smaller than that of scheduling units; selecting J user groups meeting a preset condition to adopt a multi-user service mode when the total number of the users to be served is not smaller than that of scheduling unit, J is an integer greater than 1, and 2J is an integer not greater than the total number of the users to be served; one time-frequency resource only corresponds to one beam configured for communication in the single-user service mode but at least two beams in the multi-user service mode.

20 Claims, 3 Drawing Sheets

(51) Int. Cl.
*H04B 7/26* (2006.01)
*H04L 5/00* (2006.01)
*H04W 72/06* (2009.01)
*H04W 72/08* (2009.01)

(52) U.S. Cl.
CPC ......... *H04L 5/0048* (2013.01); *H04W 72/042* (2013.01); *H04W 72/06* (2013.01); *H04W 72/082* (2013.01)

(56) References Cited

U.S. PATENT DOCUMENTS

| | | | |
|---|---|---|---|
| 2008/0056414 A1* | 3/2008 | Kim | H04B 7/063 375/347 |
| 2008/0187060 A1* | 8/2008 | Park | H04B 7/0452 375/260 |
| 2009/0042617 A1* | 2/2009 | Li | H04L 1/0017 455/562.1 |
| 2009/0190687 A1* | 7/2009 | Moon | H04B 7/0417 375/267 |
| 2009/0245153 A1 | 10/2009 | Li et al. | |
| 2013/0308727 A1* | 11/2013 | Guo | H04B 7/0434 375/299 |
| 2015/0237617 A1* | 8/2015 | Chen | H04W 72/0413 370/329 |
| 2016/0134342 A1* | 5/2016 | Kneckt | H04B 7/0452 375/267 |
| 2016/0211899 A1 | 7/2016 | Yang et al. | |

FOREIGN PATENT DOCUMENTS

| | | |
|---|---|---|
| CN | 103547341 A | 1/2014 |
| CN | 103688474 A | 3/2014 |
| EP | 2037646 A2 | 3/2009 |
| JP | 2011188446 A | 9/2011 |

OTHER PUBLICATIONS

Partial Supplementary European Search Report dated Jun. 16, 2017, Application No. 14805122.1-1874 / 3160057, Applicant ZTE Corporation, 17 Pages.

* cited by examiner

METHOD FOR SELECTING USER SERVICE MODE, METHOD FOR SENDING PILOT INFORMATION, AND APPARATUSES, AND STORAGE MEDIUM

CROSS-REFERENCE TO RELATED APPLICATIONS

This application is a U.S. national phase of PCT Application No. PCT/CN2014/087169 filed on Sep. 23, 2014, which claims priority to Chinese Patent Application No. 201410280386.6 filed on Jun. 20, 2014, the disclosures of which are incorporated in their entirety by reference herein.

TECHNICAL FIELD

The present document relates to the user service mode selection and computation in the communication field, and in particular to a user service mode selection method in the case of 3D beams, a pilot frequency information sending method and apparatus, and a storage medium.

BACKGROUND

As the increasing number of users in the residence community and increasing amount of communication services performed by users, the conventional 2D antenna configuration cannot meet the demands of users any more. Qualcomm, Alcatel-Lucent, DOCOMO, Nokia Siemens Networks and Vodafone and so on have founded a working team for Advanced Radio Interface Technologies for 4G Systems (ARTIST4G). Herein the key technologies such as 3D multi-antenna technologies including cell splitting, dynamic 3D pre-coding technology and dynamic downward inclination angle adjustment, have attracted a great amount of industrial attention in the aspects of improving the total throughout and the average throughout of the users in a residence community.

3D Beam forming technology based on adaptive antenna system (AAS) can adjust the radiation angle of the vertical dimension of beams based on the position of a user, and lays a necessary theoretical foundation for the realization of a 3D dual-beam scenario.

In a 3D dual-beam scenario, a base station generates, by using a 3D beam forming technology, two beams synchronously which share the same time-frequency resource and whose vertical dimensions have different radiation angles. Herein the beam whose radiation angle is towards the center of a residence community is called an inner beam while the beam whose radiation angle is towards the edge of the residence community is called an outer beam. The two beams may provide services synchronously for different users to increase the number of the users served in the residence community. Also, the two beams may serve the same user at the same time to improve communication performance for the user. Thus, how to particularly use such two beans, an inner beam and an outer beam, to provide users with services meeting a communication quality standard while increasing the capacity of a communication system as much as possible has became an important problem that needs to be solved in the existing art.

SUMMARY

In view of this, the embodiment of the present document provides a user service mode selection method and apparatus for use in the case of 3D beams and a storage medium to intend to address the conflict between the communication capacity and the communication quality of a residence community, besides, the embodiment of the present document also provides a pilot frequency information sending method and apparatus expecting reducing the busyness of a system.

To achieve the purposes above, the technical schemes of the embodiment of the present document are implemented in the following way.

In accordance with the first aspect of the embodiment of the present document, a user service mode selection method for use in the case of 3D beams is provided which includes:

comparing a total number of users to be served with a total number of scheduling units;

selecting a single-user service mode for each user when the total number of the users to be served is smaller than the total number of scheduling units;

selecting a multi-user service mode for J user groups meeting a preset condition when the total number of the users to be served is not smaller than the total number of scheduling unit, herein each user group includes two users to be served who perform downlink communication by using a same time-frequency resource, J is an integer greater than 1, and 2J is an integer not greater than the total number of the users to be served, herein in the single-user service mode, one time-frequency resource corresponds to only one beam configured for communication; and in the multi-user service mode, one time-frequency resource corresponds to at least two beams configured for communication through spatial division multiplexing.

Alternatively, the users to be served include users to be served whose user service mode has been determined and users to be served whose user service mode has not been determined; and each user group of the J user groups includes at least one user whose user service mode has not been determined.

Alternatively, selecting J user groups meeting a preset condition includes:

calculating Signal-to-Noise Ratio (SNR) of each user in the multi-user mode;

determining a downlink channel capacity of each user group according to the SNR of each user in the multi-user mode; and selecting J user groups whose channel capacity is greater than a first threshold or J user groups which are ranked ahead in channel capacity. Alternatively, the beams corresponding to the same time-frequency resource are divided into inner beams and outer beams; and calculating the SNR of each user in the multi-user mode includes:

calculating the signal-to-noise ratio $SINR_{inner}$ of the inner beams and the signal-to-noise ratio $SINR_{outer}$ of the outer beams corresponding to each user according to following formulas:

$$SINR_{inner} = \max(SINR_1^{Beaminner}, SINR_2^{Beaminner}, \ldots, SINR_m^{Beaminner}), \text{ and}$$

$$SINR_{outer} = \max(SINR_1^{Beamouter}, SINR_2^{Beamouter}, \ldots, SINR_n^{Beamouter}),$$

in which $SINR_m^{Beaminner}$ represents the SNR corresponding to the mth inner beam, $SINR_n^{Beamouter}$ represents the SNR of the nth outer beam, and m and n both are integers not smaller than 1;

and calculating the signal-to-noise ratio $SINR_{multi-user}$ of each user in the multi-user service mode according to following formulas:

$$SINR_{inner/multi-user}=SINR_{inner}/(SINR_{outerresidual}+1),$$

$$SINR_{outer/multi-user}=SINR_{outer}/(SINR_{innerresidual}+1),$$
and $$SINR_{multi-user}=\max(SINR_{inner/multi-user}, SINR_{outer/multi-user}),$$

in which $SINR_{outerresidual}=SINR_{outer}*(w_{outer} \cdot w_{inner}')$, $SINR_{innerresidual}=SINR_{inner}*(w_{outer} \cdot w_{inner}')$, $SINR_{inner/multi-user}$ represents the SNR corresponding to inner beams in the multi-user mode, $SINR_{outer/multi-user}$ represents the SNR of outer beams in the multi-user mode, $W_{outer}$ represents a weight vector corresponding to outer beams respectively, $W_{inner}$ represents a weight vector corresponding to inner beams respectively, $SINR_{outerresidual}$ represents an interference caused by outer beams to inner beams; and $SINR_{innerresidual}$ represents the interference caused by inner beams to outer beams.

Alternatively, determining the downlink channel capacity of each user group according to the SNR of each user in a multi-service mode refers to determining the downlink channel capacity $THR_{multi-user}$ of each user group according to following formula:

$$THR_{multi-user}=\log 2(1+SINR_{inner/multi-user}')+\log 2(1+SINR_{outer/multi-user}'),$$

in which $SINR_{inner/multi-user}'$ represents the SNR of the users who use inner beams for communication in the multi-user mode, and $SINR_{outer/multi-user}'$ represents the SNR of the users who use inner beams for communication in the multi-user mode.

Alternatively, the single-user service mode includes a first single-user service mode, a second single-user service mode and a third single-user service mode;

in the first single-user service mode, one beam is transmitted, and the transmitted beam is configured for the downlink transmission of a single user;

in the second single-user service mode, at least two beams which carry same information are transmitted, and the at least two beams transmitted are configured for the downlink transmission of a single user; and in the third single-user service mode, at least two beams which carry different information are transmitted, and the at least two beams transmitted are configured for the downlink transmission of a single user.

Alternatively, selecting a single-user service mode for each user when the total number of the users to be served is smaller than the total number of scheduling units refers to:

selecting the first single-user service mode, the second single-user service mode or the third single-user service mode according to the SNR corresponding to each single-user service mode when the total number of the users to be served is smaller than the total number of scheduling units.

Alternatively, before selecting the first single-user service mode, the second single-user service mode or the third single-user service mode according to the SNR corresponding to each single-user service mode, the method further includes:

calculating the signal-to-noise ratio $SINR_{inner}$ of the inner beams and the signal-to-noise ratio $SINR_{outer}$ of the outer beams corresponding to each user according to following formulas:

$$SINR_{inner}=\max(SINR_1^{Beaminner}, SINR_2^{Beaminner}, \ldots, SINR_m^{Beaminner}) \text{ and}$$

$$SINR_{outer}=\max(SINR_1^{Beamouter}, SINR_2^{Beamouter}, \ldots, SINR_n^{Beamouter}),$$

in which $SINR_m^{Beaminner}$ represents the SNR corresponding to a mth inner beam, $SINR_n^{Beamouter}$ represents the SNR corresponding to a nth outer beam, and m and n are both integers not smaller than 1;

selecting the first single-user service mode, the second single-user service mode or the third single-user service mode if both the $SINR_{inner}$ and the $SINR_{outer}$ are not smaller than a first threshold;

selecting the first single-user service mode and selecting the beam corresponding to the $SINR_{inner}$ to configure for the downlink communication of the user if the $SINR_{inner}$ is not smaller than the first threshold and the $SINR_{outer}$ is smaller than the first threshold;

selecting the first single-user service mode and selecting the beam corresponding to the $SINR_{outer}$ to configure for the downlink communication of the user if the $SINR_{inner}$ is smaller than the first threshold and the $SINR_{outer}$ is not smaller than the first threshold.

Alternatively, in a case where the first single-user service mode, the second single-user service mode or the third single-user service mode is selected when the $SINR_{inner}$ and the $SINR_{outer}$ are both not smaller than the first threshold, the method further includes:

selecting the first single-user service mode, the second single-user service mode or the third single-user service mode according to requirement of the user on communication.

In accordance with the second aspect of the embodiment of the present document, a pilot frequency information sending method is provided which includes:

determining a number N of beams for sending pilot frequency information, herein N is an integer not smaller than 1 and not greater than a total number of ports;

forming N pieces of pilot frequency information, herein different pilot frequency information is carried on different beams and sent by different ports; and making the N pieces of pilot frequency information carried on the N beams to send.

In accordance with the third aspect of the embodiment of the present document, a user service mode selection apparatus in the case of 3D beams is provided which includes:

a comparison unit arranged to compare a total number of users to be served with a total number of scheduling units;

a first selection unit arranged to select a single-user service mode for each user when the total number of the users to be served is smaller than the total number of scheduling units; and a second selection unit arranged to select a multi-user service mode for J user groups meeting a preset condition when the total number of the users to be served is not smaller than the total number of scheduling unit, herein each user group includes two users to be served who perform downlink communication by using a same time-frequency resource, J is an integer greater than 1, and 2J is an integer not greater than the total number of the users to be served, herein in the single-user service mode, one time-frequency resource corresponds to only one beam configured for communication; and in the multi-user service mode, one time-frequency resource corresponds to at least two beams configured for communication through spatial division multiplexing.

Alternatively, the users to be served include users to be served whose user service mode has been determined and users to be served whose user service mode has not been determined; and each user group of the J user groups includes at least one user whose user service mode has not been determined.

Alternatively,

The first selection unit includes:

a first calculation module arranged to calculate Signal-to-Noise Ratio (SNR) of each user in the multi-user mode;

a determination module arranged to determine a downlink channel capacity of each user group according to the SNR of each user in the multi-user mode; and a first selection module arranged to select J user groups whose channel capacity is greater than a first threshold or J user groups which are ranked ahead in channel capacity.

Alternatively, the first calculation module is arranged to calculate the Signal-to-Noise Ratio (SNR) of each user in the multi-user mode according to following formulas:

$$SINR_{inner} = \max(SINR_1^{Beaminner}, SINR_2^{Beaminner}, \ldots, SINR_m^{Beaminner}),$$

$$SINR_{outer} = \max(SINR_1^{Beamouter}, SINR_2^{Beamouter}, \ldots, SINR_n^{Beamouter}), \text{ and}$$

$$SINR_{inner/multi-user} = SINR_{inner}/(SINR_{outerresidual}+1) \text{ or}$$

$$SINR_{outer/multi-user} = SINR_{outer}/(SINR_{innerresidual}+1),$$

in which $SINR_{outerresidual} = SINR_{outer}*(w_{outer} \cdot w_{inner}')$, $SINR_{innerresidual}$ $SINR_{inner}*(w_{outer} \cdot w_{inner}')$; $SINR_{inner}$ represents the SNR corresponding to the inner beam of each user; $SINR_{outer}$ represents the SNR corresponding to the outer beam; $SINR_m^{Beaminner}$ represents the SNR corresponding to the mth inner beam; $SINR_n^{Beamouter}$ represents the SNR corresponding to the nth outer beam; m and n are both integers not smaller than 1; $SINR_{inner/multi-user}$ represents the SNR corresponding to inner beams in the multi-user service mode; $SINR_{outer/multi-user}$ represents the SNR corresponding to outer beams in the multi-user service mode; $w_{outer}$ represents a weight vector corresponding to outer beams; $W_{inner}$ represents a weight vector corresponding to inner beams respectively; $SINR_{outerresidual}$ represents an interference caused by outer beams to inner beams; and $SINR_{innerresidual}$ represents the interference caused by inner beams to outer beams.

Alternatively, the determination module is arranged to determine the downlink channel capacity $THR_{multi-user}$ of each user group according to following formula:

$$THR_{multi-user} = \log 2(1+SINR_{inner/multi-user}') + \log 2(1+SINR_{outer/multi-user}'),$$

in which $SINR_{inner/multi-user}'$ represents the SNR of the users who use inner beams for communication in the multi-user mode, and $SINR_{outer/multi-user}'$ represents the SNR of the users who use inner beams for communication in the multi-user mode.

Alternatively, the single-user service mode includes a first single-user service mode, a second single-user service mode and a third single-user service mode, in the first single-user service mode, one beam is transmitted, and the transmitted beam is configured for the downlink transmission of a single user;

in the second single-user service mode, at least two beams which carry same information are transmitted, and the at least two beams transmitted are configured for the downlink transmission of a single user; and in the third single-user service mode, at least two beams which carry different information are transmitted, and the at least two beams transmitted are configured for the downlink transmission of a single user.

Alternatively, the second selection unit is arranged to select, according to the SNR corresponding to each single-user service mode, the first single-user service mode, the second single-user service mode, or the third single-user service mode when the total number of the users to be served is smaller than the total number of scheduling units.

Alternatively, the second selection unit includes:

a second calculation module arranged to calculate the signal-to-noise ratio $SINR_{inner}$ of the inner beams and the signal-to-noise ratio $SINR_{outer}$ of the outer beams corresponding to each user according to following formulas:

$$SINR_{inner} = \max(SINR_1^{Beaminner}, SINR_2^{Beaminner}, \ldots, SINR_m^{Beaminner}) \text{ and}$$

$$SINR_{outer} = \max(SINR_1^{Beamouter}, SINR_2^{Beamouter}, \ldots, SINR_n^{Beamouter}),$$

in which $SINR_m^{Beaminner}$ represents the SNR corresponding to a mth inner beam, $SINR_n^{Beamouter}$ represents the SNR corresponding to a nth outer beam, and m and n are both integers not smaller than 1; and a second selection module arranged to select the first single-user service mode, the second single-user service mode, or the third single-user service mode if both the $SINR_{inner}$ and the $SINR_{outer}$ are not smaller than a first threshold, select the first single-user service mode and select the beams corresponding to the $SINR_{inner}$ to configure for the downlink communication of users if the $SINR_{inner}$ is not smaller than the first threshold and the $SINR_{outer}$ is smaller than the first threshold, select the first single-user service mode and select the beams corresponding to the $SINR_{outer}$ to configure for the downlink communication of the user if the $SINR_{inner}$ is smaller than the first threshold and the $SINR_{outer}$ is not smaller than the first threshold. Alternatively, the second selection module is arranged to select the first single-user service mode, the second single-user service mode or the third single-user service mode according to the requirement of the user on communication when the $SINR_{inner}$ and the $SINR_{outer}$ are both not smaller than the first threshold.

In accordance with a fourth aspect of the present document, a pilot frequency information sending apparatus is provided which includes:

a determination unit arranged to determine a number N of beams for sending pilot frequency information, herein N is an integer not smaller than 1 and not greater than a total number of ports;

a formation unit arranged to form N pieces of pilot frequency information; herein different pilot frequency information is carried on different beams and sent by different ports; and a sending unit arranged to make the N pieces of pilot frequency information carried on the N beams to send.

In accordance with a fifth aspect of the embodiment of the present document, a computer storage medium is further provided in which computer-executable instructions are stored that are arranged to execute at least one of the methods in the first and the second aspect of the embodiment of the present document.

When determining a user service mode for a user, the user service mode selection method and apparatus for use in the case of 3D beams and the computer storage medium in the embodiment of the present document compare the total number of the users to be served with that of scheduling units and select a single-user service mode or multi-user service mode for the user according to the result of the comparison, thus perfectly addressing the problem existing in the conventional art that the determination of a user service mode merely based on the current requirement of the user may lead to a small system capacity while merely in consideration of the communication capacity of a system may lead to unpleasant communication quality of a single user.

By determining the amount of pilot frequency information according to the number of the beams for sending pilot frequency information, the pilot frequency information sending method and apparatus in the embodiment of the present document avoid the problem existing in the conventional art that the formation of a piece of pilot frequency information for each sending port prior to the selection of a sending port results in a large amount of pilot frequency information processing.

PREFERRED EMBODIMENTS OF THE PRESENT DOCUMENT

Preferred embodiments of the present document are described below in detail with reference to accompanying drawings, and it should be appreciated that the preferred embodiments described below are merely illustrative of the present document but not to be construed as limiting the present document.

Embodiment 1

Figure 1:
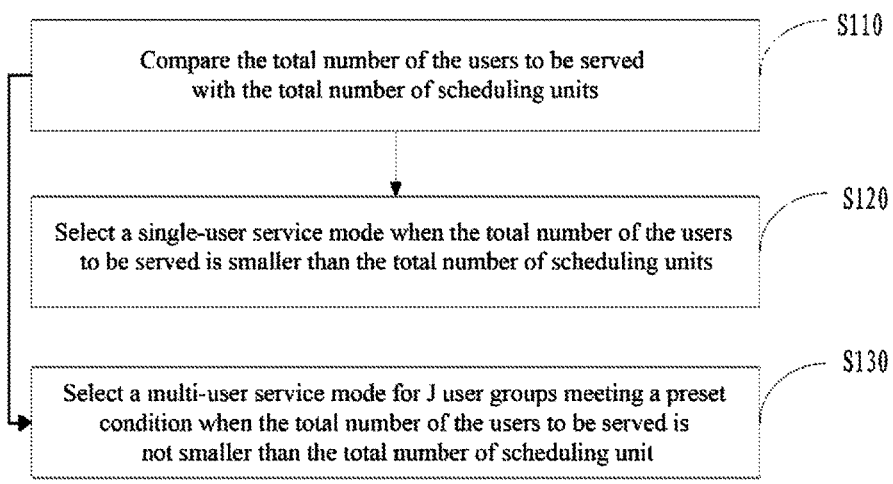
FIG. 1 is a flowchart illustrating a user service mode selection method in the case of 3D beams provided in an embodiment of the present document.

As shown in FIG. 1, a user service mode selection method in the case of 3D beams is provided in the embodiment, herein the user service mode includes a single-user service mode and a multi-user service mode, and the method includes the following steps:

Step S110: comparing the total number of the users to be served with that of scheduling units;

Step S120: selecting a single-user service mode for each user when the total number of the users to be served is smaller than that of scheduling units, and Step S130: selecting J user groups meeting a preset condition to adopt the multi-user service mode when the total number of the users to be served is not smaller than that of scheduling unit, herein each user group includes two to-be-served users who perform downlink communication using the same time-frequency resource, J is an integer greater than 1, and 2J is an integer not greater than the total number of the users to be served.

In the single-user service mode, one time-frequency resource corresponds to only one beam configured for communication;

and in the multi-user service mode, one time-frequency resource corresponds to at least two beams in virtue of spatial division multiplexing.

In specific implementations, in a residence community defined by a base station, a time-frequency resource is used only for the communication of a single user in the single-user service mode but for the communication of at least two users in the multi-user service mode.

Generally, in the embodiment, step 110 to step 130 are executed by a base station which refers specifically to, for example, an evolved Node B (eNB). The user mentioned in the embodiment of the present document is corresponding to a terminal. One terminal may correspond to one user, such as a single-mode terminal, but may also correspond to multiple users, such as a multi-mode terminal.

Generally, a scheduling device for radio resource scheduling needs to perform a plurality of scheduling operations when making the radio resource scheduling. In one scheduling period, one scheduling unit can generally schedule only one time-frequency resource. Therefore, if each user is required to correspond to one or more time-frequency resources in a case where the total number of the users to be served is greater than that of scheduling units, it is apparently that some users cannot get a time-frequency resource, resulting in that the cell capacity can not provide for the communication of all the users to be served in the residence community.

In a case where the total number of scheduling units is greater than that of the users to be served, some users require for high transmission speed while some require for high communication reliability, the adoption of a scheme of making one user to correspond to one time-frequency resource may not satisfy the demands of these users.

Therefore, in the embodiment, the total number of scheduling units is compared with that of the users to be served first, and then a subsequent scheduling operation is performed according to the result of the comparison.

In a case where the total number of scheduling units is greater than that of the users to be served, the user service mode for at least a part of users should be of the multi-user service mode. Specifically, the multi-user service mode is a mode in which at least two beams are emitted for the downlink transmission of two different users so that a base station can serve more users at the same time.

Specifically, for example, assume that scheduling units can schedule only one time-frequency resource, that is, a time-frequency resource A, in the multi-user service mode, the time-frequency resource A corresponds to a beam 1 for the downlink transmission of a user 1 and a beam 2 for the downlink transmission of a user 2 at the same time. The beams 1 and 2 are multiplexed spatially, Specifically, for example, the beam 1 is an inner beam while the beam 2 is an outer beam. Co-frequency interference of the two beams can be avoided for adopting spatial division multiplexing, but this increases cell capacity.

In specific implementations, if the total number of the users to be served is i and that of scheduling units is j, if i−j>0 is met currently, then (i−j) user groups are necessary to make each user correspond to at least one time frequency resource for communication, thus, it can be known that J is an integer not smaller than i−j, herein i and j are both integers not smaller than 1.

In specific implementations, the users to be served include those whose user service mode is determined and those whose user service mode is not determined; specifically, for example, if the user E who performs communication in the former scheduling unit proceeds requests for communication in the current scheduling unit, and the user service mode of the user E has been determined in the former scheduling unit, then the user E is determined as a user whose user service mode is determined.

Based on the above mentioned case, the step S130 of selecting J user groups meeting a preset condition is preferably in the following way.

each one of the J user groups includes at least one user is the user to be served whose user service mode has not determined. In this way, the problems of high systemic workload and low work efficiency caused by the frequent user service mode switching for the same user as well as the problems of interrupted communication and not enough communication reliability and stability caused by the switching of user service modes for a user during a communication process are avoided.

Figure 2:
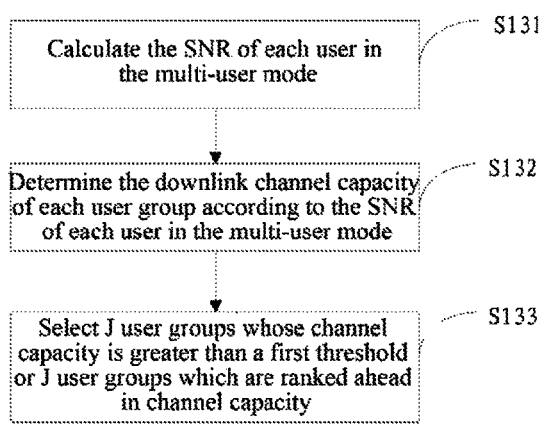
FIG. 2 is a flowchart illustrating the calculation of the SNR of each user in a multi-user service mode according to an embodiment of the present document.

Alternatively, as shown in FIG. 2, how to select the J user groups is provided in the following.

Step S131: calculating the SNR of each user in the multi-user mode;

Step S132: determining the downlink channel capacity of each user group according to the SNR of each user in the multi-service mode; and Step S133: selecting J user groups whose channel capacity is greater than a first threshold or J user groups which are ranked ahead in channel capacity.

The beams corresponding to the same time-frequency resource are divided into inner beams and outer beams; in the embodiment, the beams corresponding to the same time-frequency resource are divided into inner beams and outer beams according to radiation angle, specifically, if the central line is determined by the perpendicularity of the base station to the middle axis, then the inclined angle between the inner beam and the central line is smaller than that between the outer beam which corresponds to the same time-frequency resource with the inner beam and the central line.

The inclined angle between a beam and the central line can be referred to as a radiation angle, and generally, the radiation angle of the inner beam is closer to the center of a residency community. In specific implementations, a radiation angle range can be defined by the diameter of a residency community so as to divide inner beams and outer beams.

The Step S131 includes:

Calculating the signal-to-noise ratio $SINR_{inner}$ of the inner beams corresponding to each user and the signal-to-noise ratio $SINR_{outer}$ of the outer beams corresponding to a user according to the following formulas:

$$SINR_{inner} = \max(SINR_1^{Beaminner}, SINR_2^{Beaminner}, \ldots, SINR_m^{Beaminner}) \text{ and}$$

$$SINR_{outer} = \max(SINR_1^{Beamouter}, SINR_2^{Beamouter}, \ldots, SINR_n^{Beamouter}),$$

In which $SINR_m^{Beaminner}$ represents the SNR corresponding to the mth inner beam, $SINR_n^{Beamouter}$ represents the SNR corresponding to the nth outer beam, m and n are both integers not smaller than 1, and max( ) denotes the selection of the maximum value included in the bracket.

The signal-to-noise ratio $SINR_{multi-user}$ of each user is calculated in the multi-user service mode according to the following formulas:

$$SINR_{inner/multi-user} = SINR_{inner}/(SINR_{outerresidual}+1),$$

$$SINR_{outer/multi-user} = SINR_{outer}/(SINR_{innerresidual}+1) \text{ and}$$

$$SINR_{multi-user} = \max(SINR_{inner/multi-user}, SINR_{outer/multi-user}),$$

in which $SINR_{outerresidual} = SINR_{outer} * (w_{outer} \cdot w_{inner}')$, $SINR_{innerresidual} = SINR_{inner} * (w_{outer} \cdot w_{inner}')$, $w_{inner}'$ is the conjugate transpose of $w_{inner}$;

$SINR_{inner/multi-user}$ represents the SNR corresponding to inner beams in the multi-user mode, $SINR_{outer/multi-user}$ represents the SNR corresponding to outer beams in the multi-user mode, $W_{outer}$ represents a weight vector corresponding to outer beams respectively, $W_{inner}$ represents a weight vector corresponding to inner beams respectively, $SINR_{outerresidual}$ represents the interference caused by outer beams to inner beams; and $SINR_{innerresidual}$ represents the interference caused by inner beams to outer beams.

For example, a user group includes a user d and a user D who reside at different positions in a residency community, receive inner and outer beams that are different in SNR and select, in the multi-user mode, the beams corresponding to the bigger one in $SINR_{inner/multi-user}$ and $SINR_{outer/multi-user}$ for user d and user D.

Two beams using the same time-frequency resource are defined as a beam group. In SNR calculation, a base station sends a plurality of beam groups on which pilot frequency information are carried, receives the channel status feedback information fed back by a terminal according to the pilot frequency information and calculates an SNR according to the channel status information.

Thus, the beams above mentioned for calculating the SNR are beams on which pilot frequency information are carried prior to SNR calculation.

Specifically, for example, if 10 beam groups, that is, 20 beams, are sent currently, and there are 10 inner beams and 10 outer beams, that is, m=10 and n=10, then the inner beams and the outer beams are ranked separately.

The pilot frequency information sent from one or more beams may be received at the position of a user C, herein the beams refer to inner beams or outer beams.

The SNR may be calculated using existing methods, and the SNR of a beam for which no channel feedback information is fed back by the terminal is 0. Specifically, if the terminal corresponding to the user C receives, at its position, 2 of 10 inner beams, such as the third and the fourth beam, and the sixth one of outer beams, then the channel status feedback information fed back by the user C may include feedback information based on the pilot frequency information carried on the three beams. Thus, corresponding to the SNR calculation of the user C, the other except for the above three beams may all be 0, and the SNR regarding to the user C will be acquired from the above three beams.

A user D only receives the sixth inner beam, and the channel status feedback information fed back by the user C may only include the feedback information formed based on the pilot frequency information carried on the sixth inner beams.

In this case, a beam group may be formed for the users D and C so that the user C uses the sixth outer beam for communication while the user D uses the sixth inner beam for communication, herein the sixth inner beam and the sixth outer beam correspond to the same time-frequency resource.

Specifically, the downlink channel capacity $THR_{multi-user}$ of the user group can be calculated according to the following formula:

$$THR_{multi-user} = \log 2(1+SINR_{inner/multi-user}') + \log 2(1+SINR_{outer/multi-user}'),$$

In which $SINR_{inner/multi-user}'$ represents the SNR of the users who use inner beams for communication in the multi-user mode, $SINR_{outer/multi-user}'$ represents the SNR of the users who use inner beams for communication in the multi-user mode.

The downlink channel capacities of all user groups are ranked to select J user groups meeting a preset condition.

Typically, two users in a user group cannot obtain their communication information in time until the downlink channel capacity of the user group is greater than a certain value, for this sake, J user groups are selected whose downlink channel capacity is greater than the first threshold.

In specific implementations, there may be less than J user groups whose downlink channel capacity is greater than the first threshold, in this case, the J user groups that are ranked ahead in downlink channel capacity are selected preferably.

In specific implementations, the two ways of selecting J user groups whose channel capacity is greater than a first threshold and selecting the J user groups that are ranked ahead in downlink channel capacity may be used separately or used in combination.

In specific implementations, the selection is preferably performed from users whose service mode is not determined in the scheme of determining J user groups meeting the preset condition according to the downlink channel capacity of user group.

The foregoing description is based on a selection scheme according to which it is preferably for each user able to correspond to at least one time-frequency resource and then the personal requirement of each user on communication is considered. In specific implementations, it is also OK to consider preferably the personal requirement of each user on communication and then consider cell capacity and so on.

In specific implementations, the single-user service mode mentioned in step S120 includes a first, a second and a third single-user service mode.

In the first single-user service mode, one beam is transmitted for the downlink transmission of a single user.

In the second single-user service mode, at least two beams which carry the same information are transmitted for the downlink transmission of a single user.

In the third single-user service mode, at least two beams which carry different information are transmitted for the downlink transmission of a single user.

Thus, the step S120 refers specifically to a step of selecting a user service mode from the first, the second and the third user service mode for the downlink communication of a user, which is preferably as follows:

Calculate the signal-to-noise ratio $SINR_{inner}$ of the inner beams and the signal-to-noise ratio $SINR_{outer}$ of the outer beams corresponding to each user according to the following formulas:

$$SINR_{inner} = \max(SINR_1^{Beaminner}, SINR_2^{Beaminner}, \ldots, SINR_m^{Beaminner}) \text{ and}$$

$$SINR_{outer} = \max(SINR_1^{Beamouter}, SINR_2^{Beamouter}, \ldots, SINR_n^{Beamouter}),$$

In which $SINR_m^{Beaminner}$ represents the SNR corresponding to the mth inner beam, $SINR_n^{Beamouter}$ represents the SNR corresponding to the nth outer beam, and m and n are both integers not smaller than 1. Herein, the calculation method of $SINR_{inner}$ and $SINR_{outer}$ in the single-user mode are the same as the calculation method of $SINR_{inner}$ and $SINR_{outer}$ in the multi-user mode.

Select the first, the second or the third single-user service mode if neither of the $SINR_{inner}$ and the $SINR_{outer}$ is smaller than a first threshold.

Select the first single-user service mode and selecting the beams corresponding to the $SINR_{inner}$ for the downlink transmission of users if the $SINR_{inner}$ is not smaller than the first threshold and the $SINR_{outer}$ is smaller than the first threshold; or Select the first single-user service mode and selecting the beams corresponding to the $SINR_{outer}$ for the downlink transmission of the user if the $SINR_{inner}$ is smaller than the first threshold and the $SINR_{outer}$ is not smaller than the first threshold.

The first threshold is a pre-stored threshold which may be determined based on the statistics data on the actual demands for communication or formed by simulation.

Further, when the first, the second or the third single-user service mode is selected in the case neither of the $SINR_{inner}$ and the $SINR_{outer}$ is smaller than a first threshold, the method further includes:

Selecting the first, the second or the third single-user service mode according to the requirement of the user on communication.

Specifically, assume that there are two time-frequency resources, that is, one is time-frequency resource A and the other is time-frequency resource B, for the current downlink communication; in the case of the adoption of the single-user service mode, each time-frequency resource is only used for forming a beam; in the case of the application of the two time-frequency resources to the single-user service mode, only two beams are formed, and the formed beams may be corresponding to the inner or outer beams in the two beams carrying the pilot frequency information corresponding to the same one time-frequency resource. The correspondence between time-frequency resource and beams is reflected in that the frequency and the time of sending a beam are both determined when a time-frequency resource is determined.

Specifically, in the first single-user service mode, the time-frequency resource A corresponds to a beam 1 and the time-frequency resource B to a beam 2, if the SNRs of the inner and the outer beams corresponding to all time-frequency resources are all greater than the first threshold, then the beam 1 is merely for the downlink transmission of a user 1, the beam 2 is merely for the downlink transmission of a user 2. User 1 and user 2 are different users.

In this case, the second single-user service mode is selected if it is known from the requirement of a user on communication that the user requires for high communication reliability; the third single-user service mode is selected if it is known from the requirement of a user on communication that the user requires for high transmission speed; and one of the three single-user service mode may be selected for a user to communicate according to the communication capacity and the busyness and so on of the current communication system if it is known from the demand of the user on communication that the user has no special requirement.

In the case of the adoption of the second single-user service mode, the time-frequency resource A corresponds to the beam 1 and the time-frequency resource B to the beam 2, herein the beams 1 and 2 on which the same information are carried are both used for the downlink transmission of the user 1.

In the case of the adoption of the third single-user service mode, the time-frequency resource A corresponds to the beam 1 and the time-frequency resource B to the beam 2, herein the beams 1 and 2 carries different information but are both used for the downlink transmission of the same user, for example, for the downlink transmission of user 1 or the downlink transmission of user 2.

Specifically, if the information currently sent from the base station to the user 1 includes information A, then in the case of the second single-user service mode, the beam 1 is used to send the information A to the user 1, and the beam 2 is used to send the information A to the user 1. In such a way, a high reliability can be guaranteed.

In the case of the adoption of the third single-user service mode, the beam 1 may be used to send the information A to the user 1 and the beam 2 may be used to send information B to the user 1. Using such a method is beneficial to the fast transmission of information, especially suitable for the large amount of information interaction (e.g. the downloading of multimedia information or a game service and so on).

In specific implementations, the requirement of the user on communication can be determined according to the type of a corresponding service and/or a user preference strategy.

Specifically, determining the requirement of the user on communication according to a user preference strategy may be as follows: selecting the third single-user service mode preferably if the user C is a speed-preferring user; selecting the second single-user service mode preferably if the user C is a reliability-preferring user.

Besides, a method for calculating the SNR of each user in each service mode is also provided in the following:

Calculating the signal-to-noise ratio $SINR_1$ of each user in the first single-user service mode according to the following formula:

$$SINR_1 = \max(SINR_{inner}, SINR_{outer});$$

Calculating the signal-to-noise ratio $SINR_2$ of each user in the second single-user service mode according to the following formula:

$$SINR_2 = \max(SINR_1^{Beamgroup}, SINR_2^{Beamgroup}, \ldots, SINR_k^{Beamgroup}),$$

In which $SINR_k^{Beamgroup}$ represents the SNR corresponding to the Kth group of beams in combination, herein each group of beams includes an inner beam and an outer beam, and k is an integer not smaller than 1, specifically, $SINR_k^{Beamgroup}$ is the sum of the SNRs of the inner beam and the outer beam included in the same beam group, for example, $$SINR_k^{Beamgroup} = SINR_{inner} + SINR_{outer};$$

Calculating the signal-to-noise ratio $SINR_3$ of each user in the third single-user service mode according to the following formula:

$$SINR_3 = (SINR_{inner} + SINR_{outer})/2, \text{ and}$$

Calculating the SNR of each user in the multi-user service mode according to the following formula:

$$SINR_{inner/multi-user} = SINR_{inner}/(SINR_{outerresidual} + 1) \text{ or}$$

$$SINR_{outer/multi-user} = SINR_{outer}/(SINR_{innerresidual} + 1),$$

In which $SINR_{outerresidual} = SINR_{outer} * (w_{outer} \cdot w_{inner}')$, and $SINR_{innerresidual} = SINR_{inner} * (w_{outer} \cdot w_{inner}')$;

$w_{inner}'$ is the conjugate transpose of $w_{inner}$;

$SINR_{inner/multi-user}$ represents the SNR of inner beams in the multi-user service mode;

$SINR_{outer/multi-user}$ represents the SNR of outer beams in the multi-user service mode;

$W_{outer}$ represents a weight vector corresponding to outer beams;

$W_{inner}$ represents a weight vector corresponding to inner beams;

$SINR_{outerresidual}$ represents the interference caused by outer beams to inner beams; and $SINR_{innerresidual}$ represents the interference caused by inner beams to outer beams.

In conclusion, by taking the capacity of a cell and the requirements of users on communications into overall consideration, the user service mode selection method in the case of 3D beams provided in the embodiment of the present document can solve well the conflict between the capacity of a communication system and the communication quality of users in the existing art, and besides has the advantage of simple to realize.

Embodiment 2

Figure 3:
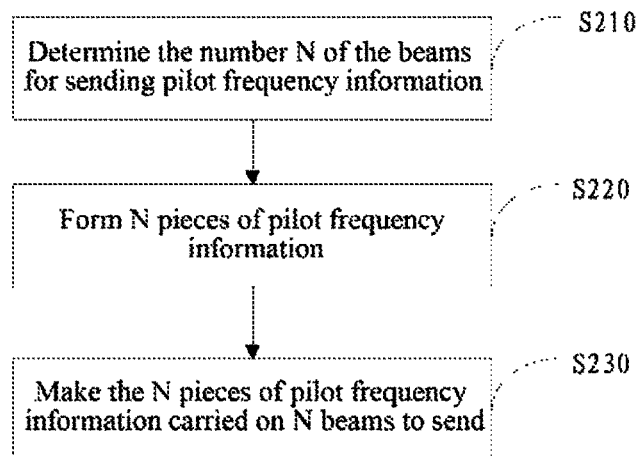
FIG. 3 is a flowchart illustrating a pilot frequency information sending method provided in an embodiment of the present document.

As shown in FIG. 3, sending the pilot frequency information may specifically include:

Step S210: determining the number N of the beams for sending pilot frequency information, herein N is an integer not smaller than 1 and not greater than the total number of ports;

Step S220: forming N pieces of pilot frequency information, herein different pilot frequency information are carried on different beams to be sent from different ports; and Step S230: making the N pieces of pilot frequency information carried on N beams to send.

The port, which refers generally to a communication interface arranged on a base station for information transmission and receiving, corresponds to a transceiver antenna in practical implementation process. When pilot frequency information is sent in the existing art, different pilot frequency information are configured for each port, and then a port is selected for sending pilot frequency information; but generally, it scarcely happens that all ports are needed for sending pilot frequency information, as a result, some pieces of configured pilot frequency information are not actually sent, which results that part of work for the configuration of the pilot frequency information is actually meaningless.

To solve the problem above, in the embodiment of the present document, pilot frequency information are formed according to a determined number of beams for sending pilot frequency information in the case that the sending port is not determined. One port is for sending one beam, so each piece of configured pilot frequency information is sent out for channel measurement and other operations, thus avoiding unnecessary work to decrease redundant operations effectively and consequentially improving the processing performance of a system and reducing the busyness of the system.

Specifically, for example, if there are currently 16 antennas which correspond to 16 ports, then it is needed to configure 16 pieces of pilot frequency information if each port is configured with one piece of pilot frequency information; however, only 8 pieces of pilot frequency information need to be sent currently, then it is not necessary to form pilot frequency information for each port prior to determining ports for sending pilot frequency information, indeed, only 8 pieces of pilot frequency information are formed, then the formed pilot frequency information are directly carried on the beams that are determined for sending pilot frequency information and then sent from ports, then only 8 is needed to configure, which obviously reduces the workload of a configuration device, simplifies the operations of devices and saves a device resource.

Further, the sending of the pilot frequency information described in the embodiment provides a basis for the calculation of an SNR for the selection of various user modes described in embodiment 1.

The user mode includes a first, a second and a third single-user service mode and a multi-user service mode.

Embodiment 3

Figure 4:
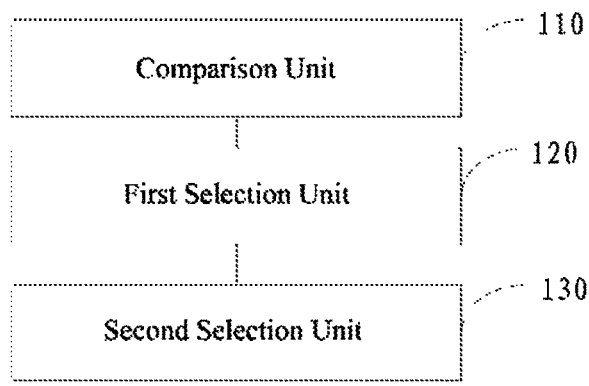
FIG. 4 is a schematic diagram illustrating the structure of a user service mode selection apparatus in the case of 3D beams provided in an embodiment of the present document.

As shown in FIG. 4, a user service mode selection apparatus for use in the case of 3D beams is provided in the embodiment, herein the user service mode includes a single-user service mode and a multi-user service mode, and the apparatus includes:

A comparison unit 110 arranged to compare the total number of the users to be served with that of scheduling units;

A first selection unit 120 arranged to select a single-user service mode for each user when the total number of the users to be served is smaller than that of scheduling units; and A second selection unit 130 arranged to select J user groups meeting a preset condition to adopt a multi-user service mode when the total number of the users to be served is not smaller than the total number of scheduling unit, herein each user group includes two users to be served who perform downlink communication by using a same time-frequency resource, J is an integer greater than 1, and 2J is an integer not greater than the total number of the users to be served, herein In the single-user service mode, one time-frequency resource corresponds to only one beam configured for communication; and In the multi-user service mode, one time-frequency resource corresponds to at least two beams configured for communication through spatial division multiplexing.

The specific structure of the comparison unit 110, the first selection unit 120 and the second selection unit 130 may include a storage medium and a processor, which are connected through a bus line and other structures to achieve information interaction between them. The processor may include a processing device with a processing function, for example, a microprocessor, a central processing unit, a digital signal processor a programmable logic array. Any two of the comparison unit 110, the first selection unit 120 and the second selection unit 130 may correspond to different processors respectively, or are integrated to correspond to the same one processor, and when integration to correspond to the same one processor is used, the processor can take the time division multiplexing way to achieve the functions of different units.

In specific implementations, the comparison unit may also correspond to a comparator or a logic circuit having a comparison function and other structures.

Alternatively,

The users to be served include those whose user service mode is determined and those whose user service mode is not determined; and Each user group of the J user groups includes at least one to-be-served user whose user service mode is not determined.

Figure 5:
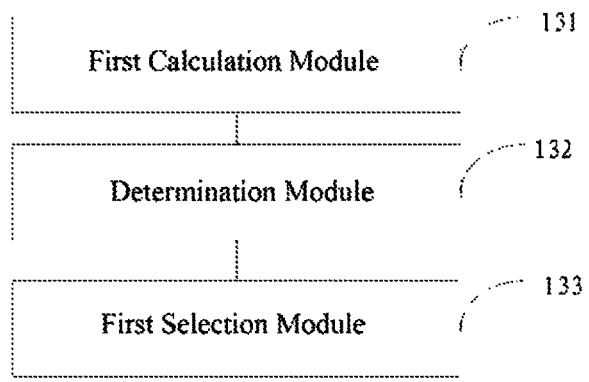
FIG. 5 is a schematic diagram illustrating the structure of a second selection unit provided in an embodiment of the present document.

As shown in FIG. 5, the first selection unit includes:

A first calculation module 131 arranged to calculate the Signal-to-Noise Ratio (SNR) of each user in the multi-user mode;

A determination module 132 arranged to determine the downlink channel capacity of each user group according to the SNR of each user in the multi-service mode; and A first selection module 133 arranged to select J user groups whose channel capacity is greater than a first threshold or J user groups which are ranked ahead in channel capacity.

The first calculation module 131 may correspond to a calculator or a processor having a calculation function. The determination module 132 and the first selection module 133 may correspond to processors.

Alternatively, the beams corresponding to the same time-frequency resource are divided into inner beams and outer beams; and The first calculation module 131 is arranged to calculate the Signal-to-Noise Ratio (SNR) of each user in the multi-user mode according to the following formulas:

$$SINR_{inner} = \max(SINR_1^{Beaminner}, SINR_2^{Beaminner}, \ldots, SINR_m^{Beaminner}),$$

$$SINR_{outer} = \max(SINR_1^{Beamouter}, SINR_2^{Beamouter}, \ldots, SINR_n^{Beamouter}),$$

$$SINR_{inner/multi-user} = SINR_{inner}/(SINR_{outerresidual}+1) \text{ or}$$

$$SINR_{outer/multi-user} = SINR_{outer}/(SINR_{innerresidual}+1),$$

In which $SINR_{outerresidual} = SINR_{outer}*(w_{outer} \cdot w_{inner}')$; $SINR_{innerresidual} = SINR_{inner}*(w_{outer} \cdot w_{inner}')$; $w_{inner}'$ is the conjugate transpose of $w_{inner}$;

$SINR_{inner}$ represents the SNR of the inner beam corresponding to each user; $SINR_{outer}$ represents the SNR corresponding to the outer beam; $SINR_m^{Beaminner}$ represents the SNR corresponding to the mth inner beam; $SINR_n^{Beamouter}$ represents the SNR corresponding to the nth outer beam; m and n are both integers not smaller than 1; the symbol ' represents conjugate transpose; $SINR_{inner/multi-user}$ represents the SNR corresponding to inner beams in the multi-user service mode; $SINR_{outer/multi-user}$ represents the SNR corresponding to outer beams in the multi-user service mode; $W_{outer}$ represents a weight vector corresponding to outer beams respectively;

$W_{inner}$ represents a weight vector corresponding to inner beams respectively, $SINR_{outerresidual}$ represents the interference caused by outer beams to inner beams, and $SINR_{innerresidual}$ represents the interference caused by inner beams to outer beams.

In addition, the determination module 132 is arranged to determine the downlink channel capacity $THR_{multi-user}$ of each user group according to the following formula:

$$THR_{multi-user} = \log 2(1+SINR_{inner/multi-user}') + \log 2(1+SINR_{outer/multi-user}'),$$

In which $SINR_{inner/multi-user}'$ represents the SNR of the users who use inner beams for communication in the multi-user mode, and $SINR_{outer/multi-user}'$ represents the SNR of the users who use inner beams for communication in the multi-user mode.

Alternatively,

The single-user service mode includes a first, a second and a third single-user service mode.

In the first single-user service mode, one beam is transmitted for the downlink transmission of a single user.

In the second single-user service mode, at least two beams which carry the same information are transmitted for the downlink transmission of a single user.

In the third single-user service mode, at least two beams which carry different information are transmitted for the downlink transmission of a single user.

Specifically, the second selection module 122 is arranged to select, according to the SNRs corresponding to the single-user service modes, the first, the second or the third single-user service mode for each user when the total number of the users to be served is smaller than that of scheduling units.

Figure 6:
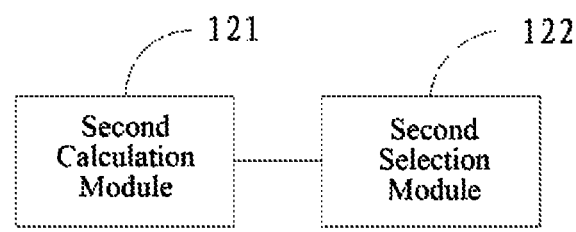
FIG. 6 is a schematic diagram illustrating the structure of a first selection unit provided in an embodiment of the present document.

As shown in FIG. 6, the second selection unit 130 includes:

A second calculation module 121 arranged to calculate the signal-to-noise ratio $SINR_{inner}$ of the inner beams and the signal-to-noise ratio $SINR_{outer}$ of the outer beams corresponding to each user according to the following formulas:

$$SINR_{inner} = \max(SINR_1^{Beaminner}, SINR_2^{Beaminner}, \ldots, SINR_m^{Beaminner}) \text{ and}$$

$$SINR_{outer} = \max(SINR_1^{Beamouter}, SINR_2^{Beamouter}, \ldots, SINR_n^{Beamouter})$$

In which $SINR_m^{Beaminner}$ represents the SNR corresponding to the mth inner beam, $SINR_n^{Beamouter}$ represents the SNR corresponding to the nth outer beam, and m and n are both integers not smaller than 1; and A second selection module 122 arranged to select the first, the second or the third single-user service mode if both the $SINR_{inner}$ and the $SINR_{outer}$ are not smaller than a first threshold, select the first single-user service mode and select the beams corresponding to the $SINR_{inner}$ if the $SINR_{inner}$ is not smaller than the first threshold and the $SINR_{outer}$ is smaller than the first threshold, select the first single-user service mode and select the beams corresponding to the $SINR_{outer}$ if the $SINR_{inner}$ is smaller than the first threshold and the $SINR_{outer}$ is not smaller than the first threshold.

The second calculation module 121 may correspond to a calculator or a processor having a calculation function. The second selection module 122 may correspond to a processor.

Alternatively,

The second selection module 122 is arranged to select the first, the second or the third single-user service mode according to the requirement of the user on communication if both the $SINR_{inner}$ and the $SINR_{outer}$ are not smaller than a first threshold.

In conclusion, the apparatus disclosed in the embodiment of the present document which may be particularly a base station, for example, an eNB that can serve as a specific hardware support for the method described the previous embodiment, can be used to realize any method described in embodiment 1, also has the advantages that the conflict between demands of users on communication and the capacity of a system is balanced and the implementation is simple and the structure is easy.

Embodiment 4

Figure 7:
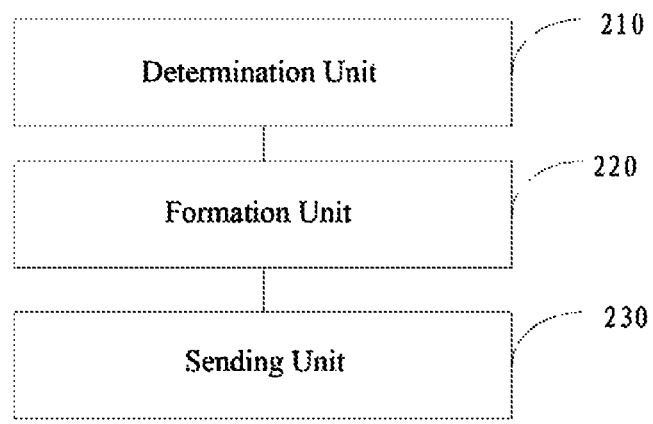
FIG. 7 is a schematic diagram illustrating the structure of a pilot frequency information sending apparatus provided in an embodiment of the present document.

As shown in FIG. 7, a pilot frequency information sending apparatus is provided which includes:

a determination unit 210 arranged to determine the number N of the beams for sending pilot frequency information, herein N is an integer not smaller than 1 and not greater than the total number of ports;

a formation unit 220 arranged to form N pieces of pilot frequency information herein different pilot frequency information is carried on different beams and sent by different ports; and a sending unit 230 arranged to make the N pieces of pilot frequency information carried on N beams to send.

The determination unit 210 and the formation unit 220 may structurally include in particular a storage medium and a processor which are connected via a bus line or other structures to achieve information interaction between them. The processor may include a processing device with a processing function, for example, a microprocessor, a central processor, a digital signal processor a programmable logic array and so on. The determination unit 210 and the formation unit 220 may correspond respectively to different processors or are integrated to correspond to the same processor, and when integration to correspond to the same processor is adopted, the processor can achieve functions of different units by using a time division multiplexing method.

The sending unit 230 may structurally include in particular a sending interface, particularly, for example, a transmitting antenna.

In conclusion, the apparatus disclosed in the embodiment of the present document may be in particular a base station, for example, an eNB, can serve as a specific hardware support for the method described in the previous embodiment, can realize any method described in embodiment 2, and also has the advantages like reducing the system processing amount.

The processor mentioned in the embodiment of the present document may be:

an Application Processor (AP), a Central Processing Unit (CPU), a Digital Signal Processor (DSP) or a Field Programmable Gate Array (FPGA).

The embodiment of the present document also provides a computer storage medium in which computer-executable instructions are stored, and the computer-executable instructions are configured as at least one of the methods of the embodiment of the present document, for example, the method shown in FIG. 1 and/or that shown in FIG. 3.

The computer storage medium may be various medium capable of storing program codes, for example, a mobile storage device, a Read-Only Memory (ROM), a Random Access Memory (RAM), a diskette or a compact disc, and alternatively a non-transient storage medium.

The above mentioned is just the preferred embodiments of the present document, not used for limiting the protection scope of the present document. Any modification made by following the principle of the present invention should be construed as falling within the protection scope of the present document.

What we claim is:

1. A user service mode selection method in a case of 3D beams, comprising:

comparing a total number of users to be served with a total number of schedulers;

selecting a single-user service mode for each user when the total number of the users to be served is smaller than the total number of schedulers;

selecting J user groups meeting a preset condition to adopt a multi-user service mode when the total number of the users to be served is not smaller than the total number of schedulers, wherein each user group comprises two users to be served who perform downlink communication by using a same time-frequency resource, J is an integer greater than 1, and 2J is an integer not greater than the total number of the users to be served, wherein in the single-user service mode, one time-frequency resource corresponds to only one beam configured for communication; and in the multi-user service mode, one time-frequency resource corresponds to at least two beams configured for communication through spatial division multiplexing.

2. The method according to claim 1, wherein the users to be served comprise users to be served whose user service mode has been determined and users to be served whose user service mode has not been determined; and each user group of the J user groups comprises at least one user whose user service mode has not been determined.

3. The method according to claim 1, wherein selecting J user groups meeting a preset condition comprises:

calculating Signal-to-Noise Ratio (SNR) of each user in the multi-user mode;

determining a downlink channel capacity of each user group according to the SNR of each user in the multi-user mode; and selecting J user groups whose channel capacity is greater than a first threshold or J user groups which are ranked ahead in channel capacity.

4. The method according to claim 3, wherein the beams corresponding to the same time-frequency resource are divided into inner beams and outer beams; and calculating the SNR of each user in the multi-user mode comprises:

calculating the signal-to-noise ratio $SINR_{inner}$ of the inner beams and the signal-to-noise ratio $SINR_{outer}$ of the outer beams corresponding to each user according to following formulas:

$$SINR_{inner} = \max(SINR_1^{Beaminner}, SINR_2^{Beaminner}, \ldots, SINR_m^{Beaminner}), \text{ and}$$

$$SINR_{outer} = \max(SINR_1^{Beamouter}, SINR_2^{Beamouter}, \ldots, SINR_n^{Beamouter}),$$

in which $SINR_m^{Beaminner}$ represent the SNR corresponding to the mth inner beam, $SINR_n^{Beamouter}$ represents the SNR of the nth outer beam, and m and n both are integers not smaller than 1;

and calculating the signal-to-noise ratio $SINR_{multi-user}$ of each user in the multi-user service mode according to following formulas:

$$SINR_{inner/multi-user} = SINR_{inner}/(SINR_{outerresidual}+1),$$

$$SINR_{outer/multi-user} = SINR_{outer}/(SINR_{innerresidual}+1), \text{ and}$$

$$SINR_{multi-user} = \max(SINR_{inner/multi-user}, SINR_{outer/multi-user}),$$

in which $SINR_{outerresidua} = SINR_{outer}^* (W_{outer} \cdot W_{inner}')$,
$SINR_{innerresidual} = SINR_{inner}^* (W_{outer} \cdot W_{inner}')$,
$SINR_{inner/multi-user}$ represents the SNR corresponding to inner beams in the multi-user mode,
$SINR_{outer/multi-user}$ represents the SNR of outer beams in the multi-user mode,
$W_{outer}$ represents a weight vector corresponding to outer beams respectively,
$W_{inner}$ represents a weight vector corresponding to inner beams respectively,
$SINR_{outerresidual}$ represents an interference caused by outer beams to inner beams; and
$SINR_{innerresidual}$ represents the interference caused by inner beams to outer beams.

5. The method according to claim 4, wherein determining the downlink channel capacity of each user group according to the SNR of each user in a multi-service mode refers to determining the downlink channel capacity $THR_{multi-user}$ of each user group according to following formula:

$$THR_{multi-user} = \log 2(1 + SINR_{inner/multi-user}') + \log 2(1 + SINR_{outer/multi-user}'),$$

in which $SINR_{inner/multi-user}'$ represents the SNR of the users who use inner beams for communication in the multi-user mode, and $SINR_{outer/multi-user}'$ represents the SNR of the users who use outer beams for communication in the multi-user mode.

6. The method according to claim 1, wherein the single-user service mode comprises a first single-user service mode, a second single-user service mode and a third single-user service mode;

in the first single-user service mode, one beam is transmitted, and the transmitted beam is configured for the downlink transmission of a single user;

in the second single-user service mode, at least two beams which carry same information are transmitted, and the at least two beams transmitted are configured for the downlink transmission of a single user; and in the third single-user service mode, at least two beams which carry different information are transmitted, and the at least two beams transmitted are configured for the downlink transmission of a single user.

7. The method according to claim 6, wherein selecting a single-user service mode for each user when the total number of the users to be served is smaller than the total number of schedulers refers to:

selecting the first single-user service mode, the second single-user service mode or the third single-user service mode according to the SNR corresponding to each single-user service mode when the total number of the users to be served is smaller than the total number of schedulers.

8. The method according to claim 7, wherein before selecting the first single-user service mode, the second single-user service mode or the third single-user service mode according to the SNR corresponding to each single-user service mode, the method further comprises:

calculating the signal-to-noise ratio $SINR_{inner}$ of the inner beams and the signal-to-noise ratio $SINR_{outer}$ of the outer beams corresponding to each user according to following formulas:

$$SINR_{inner} = \max(SINR_1^{Beaminner}, SINR_2^{beaminner}, \ldots, SINR_m^{Beaminner}) \text{ and}$$

$$SINR_{outer} = \max(SINR_1^{Beamouter}, SINR_2^{beamouter}, \ldots, SINR_n^{Beamouter}),$$

in which $SINR_m^{beaminner}$ represent the SNR corresponding to a mth inner beam, $SINR_n^{Beamouter}$ represent the SNR corresponding to a nth outer beam, and m and n are both integers not smaller than 1;

selecting the first single-user service mode, the second single-user service mode or the third single-user service mode if both the $SINR_{inner}$ and the $SINR_{outer}$ are not smaller than a first threshold;

selecting the first single-user service mode and selecting the beam corresponding to the $SINR_{inner}$ to configure for the downlink communication of the user if the $SINR_{inner}$ is not smaller than the first threshold and the $SINR_{outer}$ is smaller than the first threshold;

selecting the first single-user service mode and selecting the beam corresponding to the $SINR_{outer}$ to configure for the downlink communication of the user if the $SINR_{inner}$ is smaller than the first threshold and the $SINR_{outer}$ is not smaller than the first threshold;

wherein in a case where the first single-user service mode, the second single-user service mode or the third single-user service mode is selected when the $SINR_{inner}$ and the $SINR_{outer}$ are both not smaller than the first threshold, the method further comprises:

selecting the first single-user service mode, the second single-user service mode or the third single-user service mode according to requirement of the user on communication.

9. The method according to claim 1, further comprising: in SNR calculation, sending, by a base station, a plurality of beams on which pilot frequency information are carried, receiving a channel feedback information fed back by a terminal according to the pilot frequency information and calculating an SNR according to the channel states information; wherein, sending, by a base station, a plurality of beams on which pilot frequency information are carried comprises:

determining a number N of beams for sending pilot frequency information, wherein N is an integer not smaller than 1 and not greater than a total number of ports;

forming N pieces of pilot frequency information, wherein different pilot frequency information is carried on different beams and sent by different ports; and making the N pieces of pilot frequency information carried on the N beams to send.

10. A system for user service mode selection, comprising: a user service mode selection apparatus in a case of 3D beams, wherein the user service mode selection apparatus in a case of 3D beams comprises hardware configured to execute instructions stored in a non-transitory computer readable medium to execute steps in following units:

a comparison unit arranged to compare a total number of users to be served with a total number of schedulers;

a first selection unit arranged to select a single-user service mode for each user when the total number of the users to be served is smaller than the total number of schedulers; and a second selection unit arranged to select J user groups meeting a preset condition to adopt a multi-user service mode when the total number of the users to be served is not smaller than the total number of schedulers, wherein each user group comprises two users to be served who perform downlink communication by using a same time-frequency resource, J is an integer greater than 1, and 2J is an integer not greater than the total number of the users to be served, wherein in the single-user service mode, one time-frequency resource corresponds to only one beam configured for communication; and in the multi-user service mode, one time-frequency resource corresponds to at least two beams configured for communication through spatial division multiplexing.

11. The system according to claim 10, wherein the users to be served comprise users to be served whose user service mode has been determined and users to be served whose user service mode has not been determined; and each user group of the J user groups comprises at least one user whose user service mode has not been determined.

12. The system according to claim 10, wherein the hardware is further configured to execute instructions stored in the non-transitory computer readable medium to execute steps in following modules:

wherein the first selection unit comprises:

a first calculation module arranged to calculate Signal-to-Noise Ratio (SNR) of each user in the multi-user mode;

a determination module arranged to determine a downlink channel capacity of each user group according to the SNR of each user in the multi-user mode; and a first selection module arranged to select J user groups whose channel capacity is greater than a first threshold or J user groups which are ranked ahead in channel capacity.

13. The system according to claim 11, wherein the hardware is further configured to execute instructions stored in the non-transitory computer readable medium to execute steps in following module;

wherein the beams corresponding to the same time-frequency resource are divided into inner beams and outer beams; and the first calculation module is arranged to calculate the Signal-to-Noise Ratio (SNR) of each user in the multi-user mode according to following formulas:

$SINR_{inner} = \max(SINR_1^{Beaminner}, SINR_2^{Beaminner}, \ldots, SINR_m^{Beaminner})$, $SINR_{outer} = \max(SINR_1^{Beamouter}, SINR_2^{Beamouter}, \ldots, SINR_n^{Beamouter})$, and $SINR_{inner/multi-user} = SINR_{inner} / (SINR_{outerresidual} + 1)$ or $SINR_{outer/multi-user} = SINR_{outer} / (SINR_{innerresidual} + 1)$, in which $SINR_{outerresidual} = SINR_{outer}^* (W_{outer} \cdot W_{inner}')$, $SINR_{innerresidual} = SINTR_{inner}^* (W_{outer} \cdot W_{inner}')$; $SINR_{inner}$ represents the SNR corresponding to the inner beam of each user; $SINTR_{outer}$ represents the SNR corresponding to the outer beam; $SINR_m^{beaminner}$ represent the SNR corresponding to the mth inner beam; $SINR_n^{Beamouter}$ represents the SNR corresponding to the nth outer beam; m and n are both integers not smaller than 1; $SINR_{inner/multi-user}$ represents the SNR corresponding to inner beams in the multi-user service mode; $SINR_{outer/multi-user}$ represents the SNR corresponding to outer beams in the multi-user service mode; $W_{outer}$ represents a weight vector corresponding to outer beams;

$W_{inner}$ represents a weight vector corresponding to inner beams respectively; $SINR_{outerresidual}$ represents an interference caused by outer beams to inner beams; and $SINR_{innerresidual}$ represents the interference caused by inner beams to outer beams.

14. The system according to claim 11, wherein the hardware is further configured to execute instructions stored in the non-transitory computer readable medium to execute steps in following module :

the determination module is arranged to determine the downlink channel capacity $THR_{multi-user}$ of each user group according to following formula:

$$THR_{multi-user} = \log2(1+SINR_{inner/multi-user}') + \log2(1+SINR_{outer/multi-user}'),$$

in which $SINR_{inner/multi-user}'$ represents the SNR of the users who use inner beams for communication in the multi-user mode, and $SINR_{outer/multi-user}'$ represents the SNR of the users who use outer_beams for communication in the multi-user mode.

15. The system according to claim 10, wherein
the single-user service mode comprises a first single-user service mode, a second single-user service mode and a third single-user service mode,
in the first single-user service mode, one beam is transmitted, and the transmitted beam is configured for the downlink transmission of a single user;
in the second single-user service mode, at least two beams which carry same information are transmitted, and the at least two beams transmitted are configured for the downlink transmission of a single user; and
in the third single-user service mode, at least two beams which carry different information are transmitted, and the at least two beams transmitted are configured for the downlink transmission of a single user.

16. The system according to claim 15, wherein the hardware is further configured to execute instructions stored in the non-transitory computer readable medium to execute steps in following module:
the second selection unit is arranged to select, according to the SNR corresponding to each single-user service mode, the first single-user service mode, the second single-user service mode, or the third single-user service mode when the total number of the users to be served is smaller than the total number of schedulers.

17. The system according to claim 16, wherein the hardware is further configured to execute instructions stored in the non-transitory computer readable medium to execute steps in following modules:
the second selection unit comprises:
a second calculation module arranged to calculate the signal-to-noise ratio $SINR_{inner}$ of the inner beams and the signal-to-noise ratio $SINR_{outer}$ of the outer beams corresponding to each user according to following formulas:

$$SINR_{inner} = \max(SINR_1^{Beaminner}, SINR_2^{Beaminner}, \ldots, SINR_m^{Beaminner}) \text{ and}$$

$$SINR_{outer} = \max(SINR_1^{Beamouter}, SINR_2^{Beamouter}, \ldots, SINR_n^{Beamouter}),$$

in which $SINR_m^{beaminner}$ represent the SNR corresponding to a mth inner beam, $SINR_n^{Beamouter}$ represent the SNR corresponding to a nth outer beam, and m and n are both integers not smaller than 1; and
a second selection module arranged to select the first single-user service mode, the second single-user service mode, or the third single-user service mode if both the $SINR_{inner}$ and the $SINR_{outer}$ are not smaller than a first threshold, select the first single-user service mode and select the beams corresponding to the $SINR_{inner}$ to configure for the downlink communication of users if the $SINR_{inner}$ is not smaller than the first threshold and the $SINR_{outer}$ is smaller than the first threshold, select the first single-user service mode and select the beams corresponding to the $SINR_{outer}$ to configure for the downlink communication of the user if the $SINR_{inner}$ is smaller than the first threshold and the $SINR_{outer}$ is not smaller than the first threshold.

18. The system according to claim 17, wherein the hardware is further configured to execute instructions stored in the non-transitory computer readable medium to execute steps in following module:
the second selection module is arranged to select the first single-user service mode, the second single-user service mode or the third single-user service mode according to the requirement of the user on communication when the $SINR_{inner}$ and the $SINR_{outer}$ are both not smaller than the first threshold.

19. The system according to claim 10, further comprising a pilot frequency information sending apparatus, wherein:
in SNR calculation, the pilot frequency information sending apparatus is configured to send a plurality of beams on which pilot frequency information are carried; wherein, the pilot frequency information sending apparatus comprises hardware configured to execute instructions stored in a non-transitory computer readable medium to execute steps in following units:
a determination unit arranged to determine a number N of beams for sending pilot frequency information, wherein N is an integer not smaller than 1 and not greater than a total number of ports;
a formation unit arranged to form N pieces of pilot frequency information; wherein different pilot frequency information is carried on different beams and sent by different ports;; and
a sending unit arranged to make the N pieces of pilot frequency information carried on the N beams to send.

20. A non-transitory computer storage medium, in which computer-executable instructions, which are configured for executing the following of:
comparing a total number of users to be served with a total number of schedulers;
selecting a single-user service mode for each user when the total number of the users to be served is smaller than the total number of schedulers;
selecting J user groups meeting a preset condition to adopt a multi-user service mode when the total number of the users to be served is not smaller than the total number of schedulers, wherein each user group comprises two users to be served who perform downlink communication by using a same time-frequency resource, J is an integer greater than 1, and 2J is an integer not greater than the total number of the users to be served, wherein
in the single-user service mode, one time-frequency resource corresponds to only one beam configured for communication; and
in the multi-user service mode, one time-frequency resource corresponds to at least two beams configured for communication through spatial division multiplexing.

* * * * *